(12) United States Patent
Suzuki et al.

(10) Patent No.: US 12,129,817 B2
(45) Date of Patent: Oct. 29, 2024

(54) INTERNAL COMBUSTION ENGINE

(71) Applicant: TOYOTA JIDOSHA KABUSHIKI KAISHA, Toyota (JP)

(72) Inventors: Yuki Suzuki, Kariya (JP); Mina Tachibana, Toyota (JP); Tomihisa Tsuchiya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/534,732

(22) Filed: Dec. 11, 2023

(65) Prior Publication Data

US 2024/0200517 A1     Jun. 20, 2024

(30) Foreign Application Priority Data

Dec. 20, 2022   (JP) .................. 2022-203311

(51) Int. Cl.
| | |
|---|---|
| *F02M 25/06* | (2016.01) |
| *F01M 13/00* | (2006.01) |
| *F02D 19/02* | (2006.01) |
| *F02D 19/06* | (2006.01) |
| *F02D 19/08* | (2006.01) |
| *F02M 21/02* | (2006.01) |

(52) U.S. Cl.
CPC ........ *F02M 25/06* (2013.01); *F01M 13/0011* (2013.01); *F02D 19/02* (2013.01); *F02D 19/0644* (2013.01); *F02D 19/0678* (2013.01); *F02D 19/0689* (2013.01); *F02D 19/081* (2013.01); *F02M 21/0275* (2013.01); *F02D 2250/08* (2013.01)

(58) Field of Classification Search
CPC .... F02M 21/0275; F02M 25/06; F01M 13/00; F01M 13/0011; F01M 13/022; F01M 2013/0022; F02D 19/0678; F02D 19/0689; F02D 19/081; F02D 41/0025
See application file for complete search history.

(56) References Cited

U.S. PATENT DOCUMENTS

| | | | |
|---|---|---|---|
| 5,307,784 A * | 5/1994 | Choma | ............ F02M 35/10078 123/568.17 |
| 2002/0069860 A1* | 6/2002 | Marcil | ................... F01M 13/00 123/672 |
| 2010/0012103 A1* | 1/2010 | Lewis | ................ F01M 13/0011 123/574 |
| 2010/0076664 A1* | 3/2010 | Monros | .................. F01M 13/00 123/3 |
| 2010/0180872 A1* | 7/2010 | Monros | .............. F01M 13/0011 123/573 |

(Continued)

FOREIGN PATENT DOCUMENTS

| | | | |
|---|---|---|---|
| DE | 102018213440 A1 * | 2/2020 | |
| JP | H07158539 A * | 12/1993 | |

(Continued)

*Primary Examiner* — John M Zaleskas

(57) ABSTRACT

An internal combustion engine includes an injector for injecting gaseous fuel and an inflow passage. The injector includes a nozzle hole configured to inject gaseous fuel, a nozzle valve configured to open and close the nozzle hole, and a seat surface on which the nozzle valve is seated. An inflow passage for conducting blow-by gas in a crankcase into the nozzle hole.

1 Claim, 4 Drawing Sheets

(56) References Cited

U.S. PATENT DOCUMENTS

| | | | | |
|---|---|---|---|---|
| 2010/0313843 A1* | 12/2010 | Marushima | ............ | F01M 13/022 |
| | | | | 123/196 M |
| 2014/0207360 A1* | 7/2014 | Monros | ................ | F01M 13/023 |
| | | | | 701/113 |
| 2015/0000638 A1* | 1/2015 | Monros | ................ | F02D 19/081 |
| | | | | 123/456 |
| 2016/0169143 A1* | 6/2016 | Monros | .................. | F01M 13/04 |
| | | | | 123/525 |
| 2016/0341154 A1* | 11/2016 | Okawa | ................ | F02D 13/0234 |
| 2019/0242310 A1* | 8/2019 | Dudar | ................ | F01M 13/0011 |
| 2020/0291884 A1* | 9/2020 | Zhang | ................ | F02D 41/0007 |
| 2023/0332535 A1* | 10/2023 | Suzuki | .................... | F02B 47/02 |

FOREIGN PATENT DOCUMENTS

| | | | | | |
|---|---|---|---|---|---|
| JP | H09303234 A | | 11/1997 | | |
| JP | H11303685 A | * | 11/1999 | | |
| JP | 2004036482 A | * | 2/2004 | | |
| JP | 2004251136 A | * | 9/2004 | | |
| JP | 2006226163 A | * | 8/2006 | ......... | F02D 41/3094 |
| JP | 2009121360 A | * | 6/2009 | | |
| JP | 2009281298 A | | 12/2009 | | |
| KR | 20030060256 A | * | 7/2003 | | |

* cited by examiner

INTERNAL COMBUSTION ENGINE

BACKGROUND

1. Field

The present disclosure relates to an internal combustion engine including an injector that injects gaseous fuel.

2. Description of Related Art

In an injector that injects gaseous fuel such as hydrogen gas, a nozzle valve and a seat surface on which the nozzle valve is seated are in contact with each other in a dry state. Therefore, in an injector that injects the gaseous fuel, the wear of the nozzle seat is more likely to progress than in an injector that injects liquid fuel. To address this issue, Japanese Laid-Open Patent Publication No. 2009-281298 describes an injector for gaseous fuel injection including a seat portion subjected to soft nitriding treatment to improve the wear resistance.

The soft nitriding treatment increases the manufacturing costs of the injector. Further, if the nozzle valve and the seat surface are in contact with each other in a dry state, the wear of the seat surface may not be sufficiently suppressed even if the soft nitriding treatment is performed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an internal combustion engine includes an injector for injecting gaseous fuel and an inflow passage. The injector includes a nozzle hole configured to inject gaseous fuel, a nozzle valve configured to open and close the nozzle hole, and a seat surface on which the nozzle valve is seated. An inflow passage for conducting blow-by gas in a crankcase into the nozzle hole.

In another general aspect, an internal combustion engine includes an injector, a supplying device, and processing circuitry. The injector includes a nozzle hole configured to inject gaseous fuel, a nozzle valve configured to open and close the nozzle hole, and a seat surface on which the nozzle valve is seated. The supplying device is configured to supply oil to the seat surface. The processing circuitry is configured to control the supplying device. The processing circuitry is configured to calculate a total amount of the oil evaporated from the seat surface after the supplying device stops supplying oil, and control the supplying device to supply oil when the total amount is greater than or equal to a threshold value.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
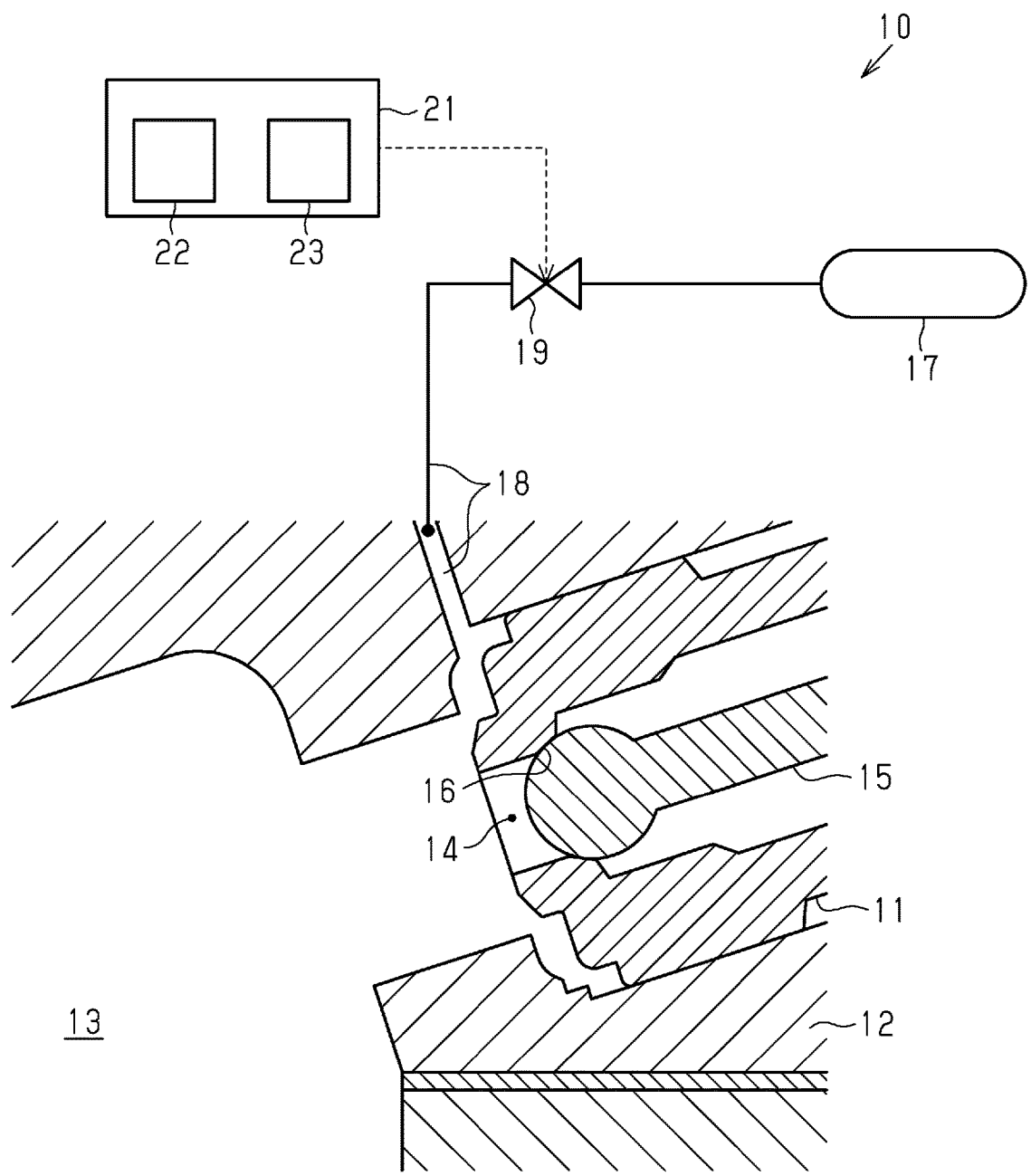
FIG. 1 is a diagram schematically showing the configuration of an internal combustion engine according to one embodiment.

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of an internal combustion engine will be described in detail with reference to FIGS. 1 to 3.

Configuration of Internal Combustion Engine

First, a configuration of an internal combustion engine 10 of the present embodiment will be described with reference to FIG. 1. The internal combustion engine 10 includes an injector 11 for injecting gaseous fuel. The internal combustion engine 10 of FIG. 1 uses hydrogen gas as the gaseous fuel. The gaseous fuel may be CNG, LPG, or the like. The injector 11 is installed in a cylinder head 12 of the internal combustion engine 10. In the internal combustion engine 10 of FIG. 1, the injector 11 is an in-cylinder injection type injector that injects gaseous fuel into the combustion chamber 13.

The injector 11 has a nozzle hole 14 through which the gaseous fuel is injected. A nozzle valve 15 and a seat surface 16 on which the nozzle valve 15 is seated are provided inside the injector 11. The nozzle hole 14 is closed when the nozzle valve 15 is seated on the seat surface 16. The nozzle hole 14 is opened when the nozzle valve 15 is separated from the seat surface 16. The injector 11 injects the gaseous fuel by opening the nozzle hole 14. The injector 11 stops the injection of the gaseous fuel when the nozzle hole 14 is closed.

The internal combustion engine 10 has an inflow passage 18 for conducting blow-by gas in a crankcase 17 into a nozzle hole 14 of an injector 11. A downstream portion of the inflow passage 18 is formed inside the cylinder head 12. The inflow passage 18 opens to a portion of the cylinder head 12 around the nozzle hole 14 of the injector 11. The inflow passage 18 is provided with a control valve 19. The control valve 19 is a valve that is opened and closed by control from outside. In the internal combustion engine 10 of FIG. 1, the control valve 19 is a normally-closed electromagnetic valve.

In the internal combustion engine 10 of FIG. 1, the pressure inside the crankcase 17 is substantially equal to the atmospheric pressure.

The internal combustion engine 10 includes a control unit 21. The control unit 21 is an electronic control unit including a processor 22 and a memory 23. In the internal combustion engine 10 of FIG. 1, the control unit 21 is configured to perform overall control of the internal combustion engine 10. For example, a program and data for controlling opening and closing of the control valve 19 are stored in advance in the memory 23 of the control unit 21. The processor 22 reads a program from the memory 23 and executes the program, so that the control unit 21 controls the internal combustion engine 10. The control unit 21 controls the opening and closing of the control valve 19 as part of the control of the internal combustion engine 10.

Various sensors installed in respective portions of the internal combustion engine 10 are connected to the control unit 21. The control unit 21 obtains a state quantity indicating the operating state of the internal combustion engine 10 based on the detection signals of the sensors. The state quantity includes the rotation speed of the internal combustion engine 10, the load factor, the water temperature, and the pressure and temperature of the gaseous fuel injected by the injector 11.

Lubrication Control of Seat Surface 16

The control unit 21 executes lubrication control for supplying the lubricant to the seat surface 16 of the injector 11 through opening/closing control of the control valve 19. The lubrication control of the seat surface 16 will be described below.

Figure 2:
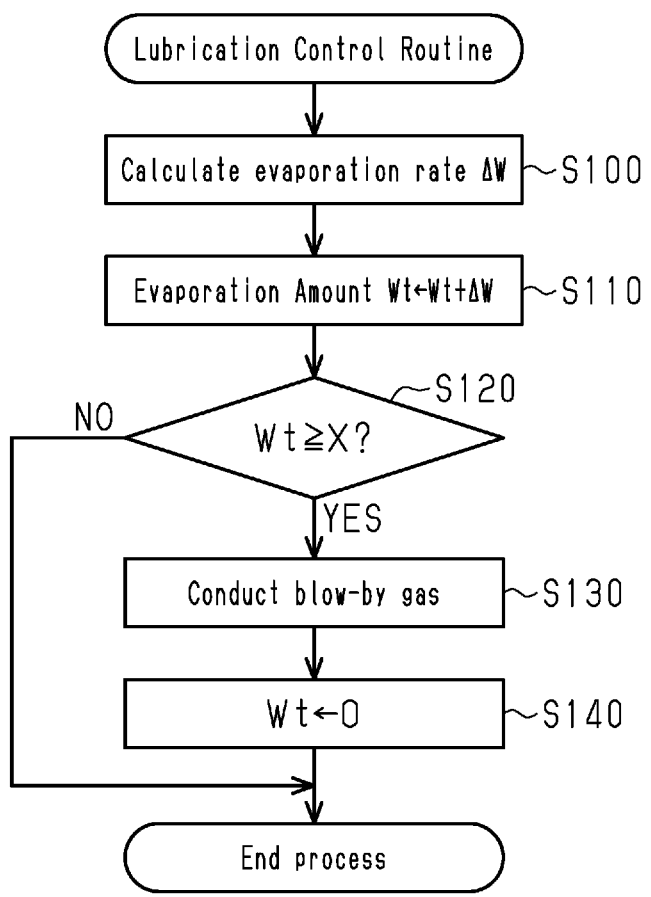
FIG. 2 is a flowchart showing processes executed by a control unit of the internal combustion engine shown in FIG. 1.

FIG. 2 shows a flowchart of a lubrication control routine executed by the control unit 21 for lubrication control of the seat surface 16. During the operation of the internal combustion engine 10, the control unit 21 repeatedly executes the routine at predetermined control intervals.

When this routine is started, the control unit 21 first calculates the evaporation rate ΔW of the oil from the seat surface 16 in step S100. Specifically, the control unit 21 calculates the value of ΔW that satisfies the relationships of Equations (1) to (3) as the value of the evaporation rate ΔW. Note that Hg represents the heat transfer rate of the gaseous fuel passing around the seat surface 16 at the time of fuel injection by the injector 11. Cp represents the specific heat of the gaseous fuel, Pg represents the pressure of the gaseous fuel, and Wgas represents the molecular weight of the gaseous fuel. Pls, Pls0, Wls, Ts, and Tbs represent the saturated vapor pressures, the molecular weights, the surface temperatures, and the boiling points of the oils, respectively. ΔHev represents the heat of vaporization of the oil at the boiling point Tbs.

$$\Delta W = \frac{Hg}{Cp} \times \ln\left(1 - \frac{Ys}{Ys - 1}\right) \quad (1)$$

$$Ys = \frac{1}{1 - \left(1 - \frac{Pg}{Pls}\right) \times \frac{W\,gas}{Wls}} \quad (2)$$

$$Pls = Pls0 \times \exp\left[\frac{\Delta Hev}{Rv}\left(\frac{1}{Tbs} - \frac{1}{Ts}\right)\right] \quad (3)$$

Among the state quantities in Equations (1) to (3), Hg, Pg, and Ts are variables, and the others are constants. The control unit 21 calculates the evaporation rate ΔW by obtaining the heat transfer rate Hg, the pressure Pg, and the temperature Ts in the following manner.

The control unit 21 obtains the pressure Pg of the gaseous fuel from the detection result of the sensor. The heat transfer rate Hg of the gaseous fuel is determined as a function of the flow velocity Vg of the gaseous fuel. The flow velocity Vg of the gaseous fuel passing around the seat surface 16 at the time of fuel injection is equal to the sound velocity. The speed of sound in the gaseous fuel is determined from the temperature and pressure Pg of the gaseous fuel. Therefore, the control unit 21 calculates the heat transfer rate Hg based on the temperature and the pressure Pg of the gaseous fuel injected by the injector 11. The temperature Ts of the oil is substantially equal to the tip temperature of the injector 11. The control unit 21 estimates the tip temperature of the injector 11 based on the rotation speed, the load factor, the water temperature, and the like of the internal combustion engine 10. The control unit 21 uses the estimated tip temperature of the injector 11 as the value of the oil temperature Ts.

Subsequently, in step S110, the control unit 21 updates the value of the evaporation amount Wt based on the evaporation rate ΔW. Specifically, the control unit 21 updates the value of the evaporation amount Wt so that the sum of the value before the update and the value of the evaporation rate ΔW becomes the value after the update.

Next, in step S120, the control unit 21 determines whether or not the evaporation amount Wt is greater than or equal to a predetermined value X. When the evaporation amount Wt is less than the threshold value X (NO), the control unit 21 ends the processing of this routine in the current control cycle. On the other hand, when the evaporation amount Wt is greater than or equal to the predetermined value X (YES), the control unit 21 proceeds to step S130.

In step S130, the control unit 21 conducts the blow-by gas into the nozzle hole 14 of the injector 11 through the inflow passage 18. Specifically, the control unit 21 repeatedly opens the control valve 19 only in the intake stroke in which the pressure in the combustion chamber 13 becomes negative during a predetermined period. Thereafter, the control unit 21 resets the value of the evaporation amount Wt to 0, and then ends the processing of this routine in the current control cycle.

In the lubrication control routine, the calculated value of the evaporation rate ΔW is added to the value of the evaporation amount Wt every time this routine is executed. On the other hand, in this routine, the value of the evaporation amount Wt is reset to 0 every time the blow-by gas is conducted. That is, the value of the evaporation amount Wt calculated in this way represents the total amount of oil evaporated from the seat surface 16 after the previous blow-by gas conduction.

Operation and Advantages of Embodiment

The internal combustion engine 10 of the present embodiment has an inflow passage 18 for conducting blow-by gas in the crankcase 17 into the nozzle hole 14 of the injector 11. The internal combustion engine 10 also includes a control valve 19 that opens and closes the inflow passage 18.

When the control valve 19 is opened during the intake stroke in which the pressure in the combustion chamber 13 becomes negative, the blow-by gas containing oil is conducted into the nozzle hole 14 of the injector 11 through the inflow passage 18. A part of the blow-by gas conducted into the nozzle hole 14 flows into the injector 11, so that the oil in the blow-by gas is supplied to the seat surface 16.

The control unit 21 calculates an evaporation amount Wt of oil from the seat surface 16. When the evaporation amount Wt becomes greater than or equal to the threshold value X, the control unit 21 controls the control valve 19 to conduct the blow-by gas for a predetermined period. The threshold value X is set to an assumed amount of oil supplied to the seat surface 16 during the period in which the blow-by gas is conducted. Therefore, in the internal combustion engine 10 of the present embodiment, oil is replenished to the seat surface 16 at an appropriate time before the oil shortage occurs.

The internal combustion engine 10 of the present embodiment described above has the following advantages.

(1) The internal combustion engine 10 includes the injector 11 for injecting gaseous fuel, and the injector 11 includes the nozzle hole 14, which injects gaseous fuel, the nozzle valve 15, which opens and closes the nozzle hole 14, and the seat surface 16, on which the nozzle valve 15 is seated. The internal combustion engine 10 further includes the inflow passage 18, which conducts blow-by gas in the crankcase 17 into the nozzle hole 14 of the injector 11. In the internal combustion engine 10, blow-by gas containing oil is conducted to the vicinity of the nozzle hole 14 of the injector 11. Some of the blow-by gas conducted into the nozzle hole 14 flows into the injector 11 from the nozzle hole 14. This supplies the oil in the blow-by gas to the seat surface 16. The supplied oil lubricates the seat surface 16. This suppresses the wear of the seat surface 16 of the injector 11 for injecting gaseous fuel.

(2) The internal combustion engine 10 further includes the control valve 19, which opens and closes the inflow passage 18, and the control unit 21, which controls opening and closing of the control valve 19. The control unit 21 calculates the evaporation amount Wt of oil from the seat surface 16, and opens the control valve 19 to conduct blow-by gas into the nozzle hole 14 of the injector 11 when the evaporation amount Wt is greater than or equal to the threshold value X. Therefore, oil can be added to the seat surface 16 at appropriate times to prevent oil starvation.

OTHER EMBODIMENTS

Modification 1

Figure 3:
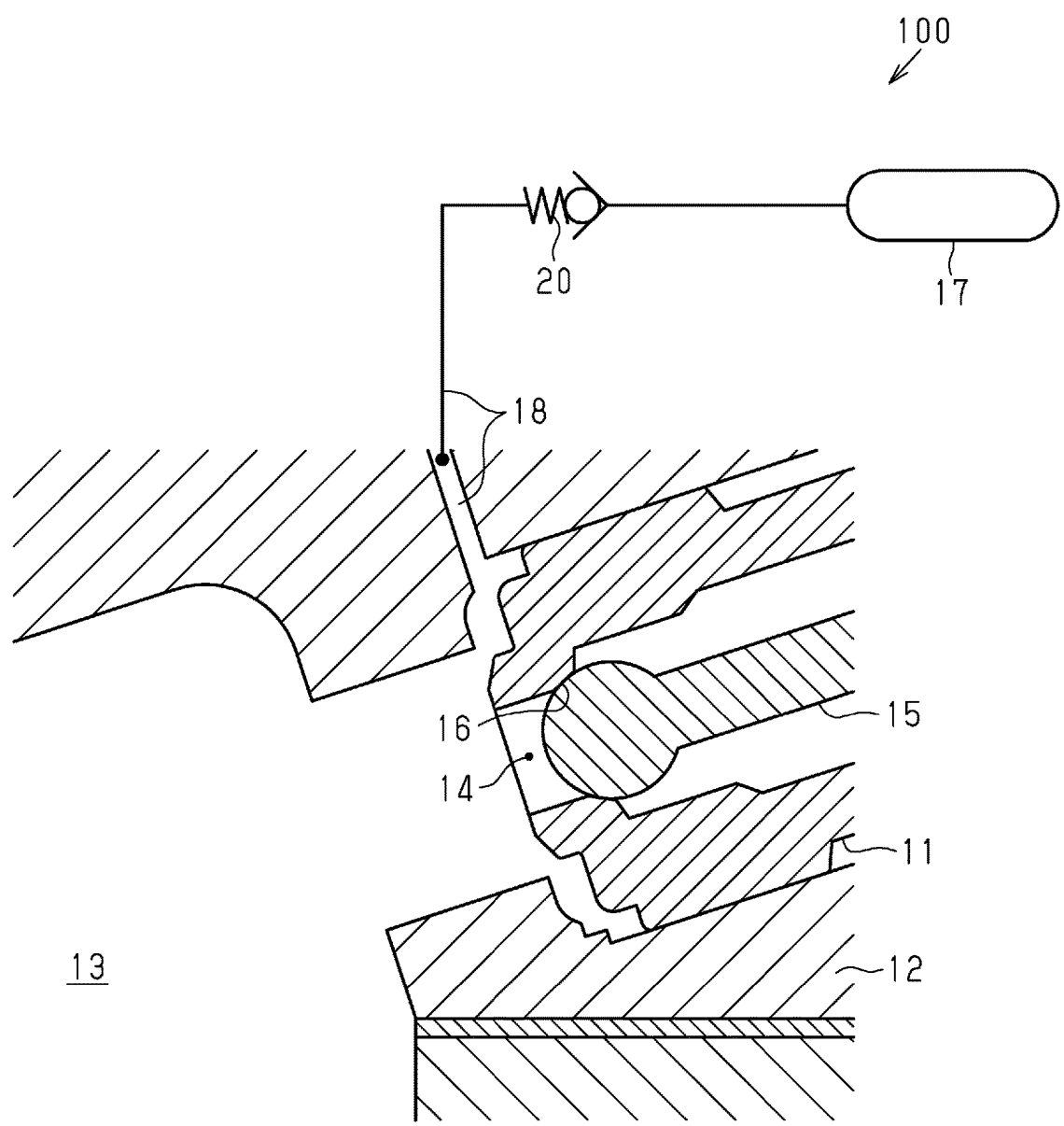
FIG. 3 is a diagram schematically showing the configuration of an internal combustion engine according to another embodiment.

As shown in FIG. 3, similarly to the internal combustion engine 10 of FIG. 1, an internal combustion engine 100 of Modification 1 includes an injector 11 for injecting gaseous fuel and an inflow passage 18 that conducts blow-by gas in a crankcase 17 into a nozzle hole 14 of the injector 11. However, instead of the control valve 19, a check valve 20 is provided in the inflow passage 18 of the internal combustion engine 100. The check valve 20 is a differential pressure regulating valve that opens when the internal pressure of the crankcase 17 is higher than the internal pressure of the combustion chamber 13 and closes when the internal pressure of the crankcase 17 is lower than the internal pressure of the combustion chamber 13.

In this internal combustion engine 100, when the internal pressure of the combustion chamber 13 during the intake stroke is negative, the check valve 20 opens so that blow-by gas is conducted into the nozzle hole 14 of the injector 11. This supplies oil in the blow-by gas to the seat surface 16. This suppresses the wear of the seat surface 16 of the injector 11 for injecting gaseous fuel. Further, when the internal pressure of the combustion chamber 13 is positive during the compression stroke or the combustion stroke, the check valve 20 closes to prevent backflow of gas from the combustion chamber 13 to the crankcase 17.

The internal combustion engine 100 of FIG. 3 may include a control unit that controls the throttle opening degree of the internal combustion engine 100, and may control the amount of oil supplied to the seat surface 16 through adjustment of the throttle opening degree by the control unit. When the throttle opening degree of the internal combustion engine 100 is decreased, the negative pressure in the combustion chamber 13 during the intake stroke increases. When the negative pressure in the combustion chamber 13 increases, the amount of blow-by gas conducted into the vicinity of the nozzle hole 14 of the injector 11 through the inflow passage 18 increases. Therefore, in the internal combustion engine 100 of FIG. 3, the amount of oil supplied to the seat surface 16 can be increased by reducing the throttle opening degree. The control unit of the internal combustion engine 100 in FIG. 3 may reduce the throttle opening degree for increasing the oil supply amount based on the evaporation amount Wt of oil from the seat surface 16. That is, the control unit of the engine 100 shown in FIG. 3 may execute the lubrication control routine shown in FIG. 2 in which step S130 is replaced with a process of reducing the throttle opening degree.

Modification 2

Figure 4:
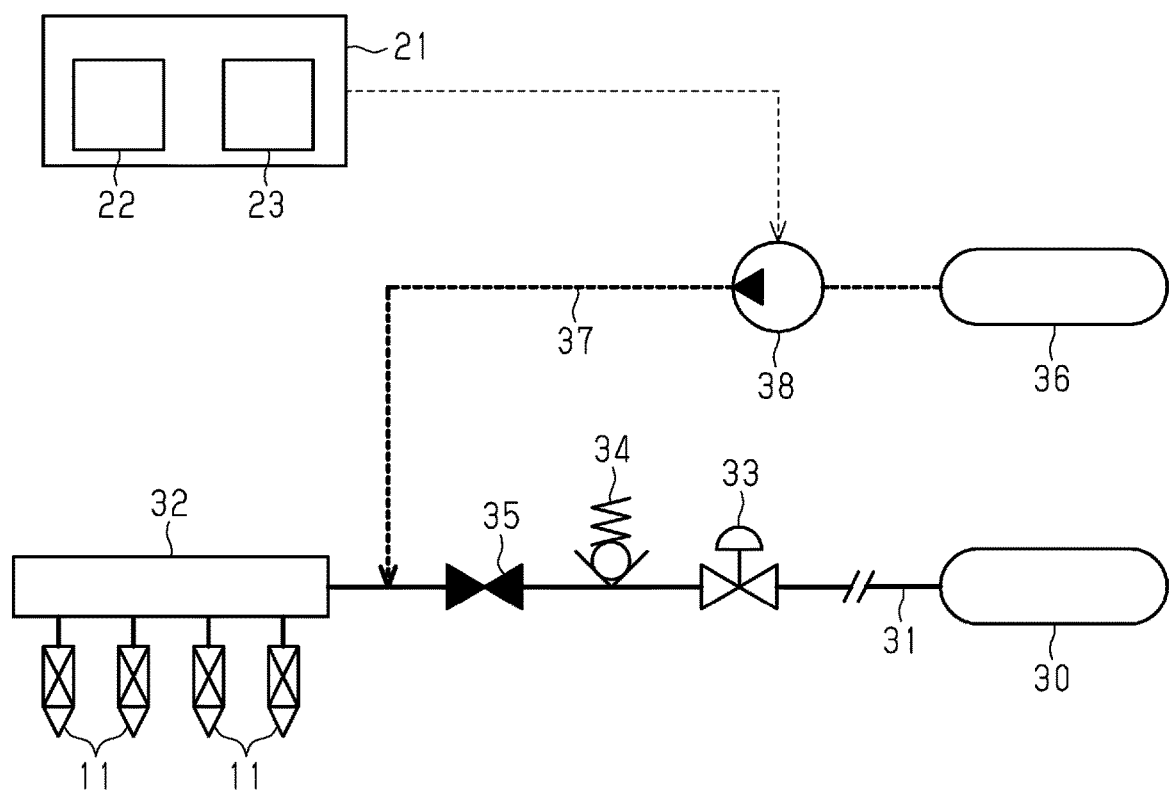
FIG. 4 is a diagram showing a configuration of a fuel system of an internal combustion engine having a lubricating function for a seat portion of an injector.

FIG. 4 shows a configuration of a fuel system of an internal combustion engine having a lubricating function for the seat portion of the injector 11. As shown in FIG. 4, the fuel system of the internal combustion engine is provided with a fuel tank 30 for storing gaseous fuel. The fuel tank 30 is connected to a delivery pipe 32 through a fuel passage 31. The injector 11 of each cylinder is connected to the delivery pipe 32. The fuel passage 31 is provided with a pressure control valve 33, a pressure regulator 34, and a gate valve 35. The pressure control valve 33 is a valve that adjusts the pressure of the gaseous fuel supplied to the delivery pipe 32. The pressure regulator 34 is a valve that relieves the gaseous fuel from the fuel passage 31 when the internal pressure of the fuel passage 31 becomes equal to or higher than a certain level. The gate valve 35 is a valve that is opened during operation of the internal combustion engine and is closed during stop of the internal combustion engine.

The fuel system is provided with an oil tank 36 for storing oil. The oil tank 36 is connected to a portion of the fuel passage 31 downstream of the gate valve 35 through an oil passage 37. The oil passage 37 is provided with an oil pump 38 that pumps up the oil in the oil tank 36 and sends the oil toward the fuel passage 31.

The operation of the oil pump 38 is controlled by a control unit 21 similar to the control unit 21 of FIG. 1. The control unit 21 calculates the evaporation amount Wt of the oil from the seat surface 16 in the same manner as in the embodiment of FIGS. 1 and 2. Then, the control unit 21 operates the oil pump 38 when the evaporation amount Wt becomes greater than or equal to the threshold value X. That is, in the lubrication control according to the second modification, step S130 in FIG. 2 is replaced with processing for operating the oil pumps 38.

In such an internal combustion engine, when the control unit 21 operates the oil pump 38, oil is added to the gas fuel supplied to the delivery pipe 32. The gaseous fuel containing oil is supplied from the delivery pipe 32 to the injector 11 of each cylinder. Thus, the oil in the gaseous fuel is supplied to the seat surface 16 of the injector 11. Thus, the wear of the seat surface 16 of the injector 11 for injecting gaseous fuel is suppressed.

Other Modifications

The above-described embodiment and Modifications 1 and 2 can be modified as follows. In addition, the following modifications can be applied to the above-described embodiment and modifications 1 and 2 in combination with each other as long as there is no technical contradiction.

In the internal combustion engine 10 of FIG. 1, in addition to the control valve 19, the check valve 20 of FIG. 3 may be provided in the inflow passage 18. In this case, regardless of whether the internal pressure of the combustion chamber 13 is a positive pressure or a negative pressure, the blow-by gas can be conducted to the vicinity of the nozzle hole 14 by maintaining the control valve 19 in an open state. Therefore, the control of the control valve 19 in the lubrication control is simplified.

The control unit 21 calculates the evaporation amount Wt of the oil from the seat surface 16 during the lubrication control. When the evaporation amount Wt becomes greater than or equal to the threshold value X, the control unit 21 supplies oil to the seat surface 16 through conduction of blow-by gas to the vicinity of the nozzle hole 14 or addition of oil to the gaseous fuel. The content of such lubrication control may be changed as appropriate. For example, the control unit 21 may supply oil to the seat surface 16 at predetermined intervals.

The injector 11 may inject the gaseous fuel into an intake port of the internal combustion engine.

The control unit may be 1) processing circuitry including one or more processors that operate according to a computer program (software); 2) processing circuitry including one or more dedicated hardware circuits such as application specific integrated circuits (ASIC) that execute at least part of various processes, or 3) processing circuitry including a combination thereof. The processor includes a central processing unit (CPU) and memories such as a random-access memory (RAM) and a read-only memory (ROM). The memories store program codes or commands configured to cause the CPU to execute processes. The memory, which is a computer-readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An internal combustion engine, comprising:
   an injector for injecting gaseous fuel, the injector including:
      a nozzle hole configured to inject the gaseous fuel;
      a nozzle valve configured to open and close the nozzle hole; and
      a seat surface on which the nozzle valve is seated; and
   an inflow passage for conducting blow-by gas in a crankcase into the nozzle hole,
   wherein the internal combustion engine further comprises:
      a control valve configured to open and close the inflow passage; and
      processing circuitry configured to control opening and closing of the control valve, and
   the processing circuitry is configured to
      calculate an evaporation amount of oil from the seat surface; and
      open the control valve to conduct the blow-by gas into the nozzle hole when the evaporation amount is greater than or equal to a threshold value.

* * * * *